United States Patent [19]
Yamaguchi et al.

[11] 3,932,350
[45] Jan. 13, 1976

[54] METHOD OF MANUFACTURING REINFORCED RESIN MOLDINGS

[75] Inventors: Tadashi Yamaguchi; Takayuki Ono, both of Sendai; Hiroshi Hoshi, Narashino; Michio Hirakawa; Isao Watanabe, both of Ichikawa, all of Japan

[73] Assignee: Lion Fat & Oil Co., Ltd., Tokyo, Japan

[22] Filed: Nov. 4, 1974

[21] Appl. No.: 520,479

Related U.S. Application Data

[63] Continuation-in-part of Ser. No. 334,663, Feb. 22, 1973, abandoned.

[30] Foreign Application Priority Data
Feb. 24, 1972  Japan.................... 47-19543

[52] U.S. Cl....... 260/42.14; 106/308 M; 260/42.43; 260/42.49; 260/42.52; 260/42.53; 264/134; 428/375
[51] Int. Cl.$^2$.................. C08K 3/34; C08K 3/40
[58] Field of Search........... 260/42.14, 42.53, 42.43, 260/42.49, 42.52; 106/308 M

[56] References Cited
UNITED STATES PATENTS

| | | | |
|---|---|---|---|
| 3,265,644 | 8/1966 | Herman et al............... | 260/8 |
| 3,635,879 | 1/1972 | Baer et al.................... | 260/42.14 |
| 3,661,620 | 5/1972 | Dekking....................... | 117/62.2 |
| 3,808,174 | 4/1974 | Yamaguchi et al............ | 260/63 R |

*Primary Examiner*—James H. Derrington
*Attorney, Agent, or Firm*—Woodhams, Blanchard and Flynn

[57] ABSTRACT

A method of manufacturing reinforced resin moldings, wherein a fiber-reinforced plastic, obtained by the polymerization, in the presence of an inorganic fibrous substance selected from the group consisting of glass fiber, slag wool and asbestos, of a vinyl monomer, within an aqueous medium in the presence of sulfur dioxide, said fiber-reinforced plastic being composed of 5 – 50 wt.% of resin and 95 – 50 wt.% of inorganic substance and coated with a polymer, is subjected to compression molding.

11 Claims, No Drawings

METHOD OF MANUFACTURING REINFORCED RESIN MOLDINGS

RELATED APPLICATION

This application is a continuation-in-part of pending application Ser. No. 334,663 filed under dated of Feb. 22, 1973, now abandoned.

BACKGROUND OF THE INVENTION a. Field of the Invention

The present invention relates to a method of manufacturing reinforced resin moldings.

b. Description of the Prior Art

The reinforced resins hitherto known have been obtained by, for instance, a method wherein glass fiber is previously impregnated with a thermosetting monomer and thereafter polymerizing it in the mold, or a method wherein a thermosetting prepolymer is applied as the adhesive sequentially after setting glass fiber in the mold beforehand and further heating and curing it so as to harden it. The adhesive prevalently employed for these conventional methods is the polyester-type thermosetting resin.

Meanwhile, there have been known instances of applying thermoplastic resins such as polyethylene, polypropylene and polystyrene-polyvinyl chloride as the adhesive to the reinforced resin. However, in the case of the reinforced resins obtained by these conventional methods, the adhesive between the fiber and the resin is not always firm, and therefore, improvement of such properties as bending strength, impact strength, water-durability and thermal stability has been hoped for. Particularly the lack of firmness of the adhesion between the fiber and the resin entails the drawbacks that the strength in water is remarkably reduced as it invites the permeation of water into the bonded surface of the fiber and the resin. This remarkable reduction of the strength in water tends to occur also in the reinforced resins obtained by the conventional kneading method as well as the polymerization method as discussed in the following.

In the case of kneading upon adding the fiber to a thermoplastic resin, due to the cutting of the fiber and the generation of friction heat of the polymer, the properties of the resulting reinforced resin are apt to be rather inferior. There is also known the method of employing the substance obtained by depositing vinyl-type solid polymer onto the surface of the fiber by applying the known polymerization initiator as the molding material for reinforced resin, but in the thus obtained thermoplastic resin–fiber complex, the degree of coating the fiber with thermoplastic resin is so low that the bonding strength between the fiber and the resin is weak and the strength of the resulting product tends to be insufficient.

Further, as another prevalent method of obtaining a molding material by coating fiber with resin, there is a method of coating the fiber which comprises dispersing the fiber and monomer in a polar solvent (hydrophilic solvent) such as water and methanol, adding a radical polymerization initiator such as organic peroxide, hydrogen peroxide, persulfate and azobisisobutyronitrile to the resulting dispersion to effect polymerization and depositing the thus produced polymer onto said fiber. However, according to this method, because of the presence of said polymerization initiator in said monomer and medium, polymerization would take place in places other than the surface of the solid particles, so that the probability of said polymer coating the fiber is rather low.

The present inventors have carried on a series of studies with a view to developing a method of remarkably improving the strength of the moldings of reinforced resin consisting of the aforesaid thermoplastic resin and fiber, and have come to accomplish the present invention.

SUMMARY OF THE INVENTION

The principal object of the present invention is to provide a method of manufacturing reinforced resin moldings having an excellent mechanical strength. Another object of the present invention is to provide a method of manufacturing reinforced resin moldings having an excellent strength particularly in water. A further object of the present invention is to provide a method of manufacturing rein moldings through comparatively easy processes.

In other words, the present invention relates to a method of manufacturing reinforced resin moldings, which comprises the processes of polymerizing an inorganic fibrous substance and vinyl-type monomer (or monomers) within an aqueous medium in the presence of sulfur dioxide to thereby obtain a molding material consisting of said inorganic fibrous substance coated with a polymer produced by said polymerization, and subjecting the thus obtained molding material to compression molding to produce reinforced resin moldings. That is, the method under the present invention consists of the first process of producing a hydrophobic molding material as coated with a polymer firmly and efficiently, and the second process of producing moldings by applying heat and pressure to the molding material obtained through said first process.

To be precise, in the first process, the molding material is to be obtained by forming a polymer or copolymer of monomers on the surface of an inorganic fibrous substance such as glass fiber, slag wool and asbestos. That is, said molding material can be produced by adding said inorganic fibrous substance to an aqueous dispersion or aqueous emulsion of monomers capable of radical polymerization or radical copolymerization and further bringing said inorganic fibrous substance in contact with sulfur dioxide to thereby effect polymerization.

The inorganic substance constituting the core of the composition (the molding material) in the present invention is, as set forth above, selected from the group consisting of glass fiber, slag wool and asbestos. As the polymerization starts and progresses while the monomer having radical polymerizability or radical copolymerizability is in the state of being adsorbed onto the surface of said core, the molding material can be obtained in the state of a polymer or copolymer formed on the surface of said core, that is, in the state of a polymer or copolymer coated on the inorganic fibrous substance.

As the glass fiber and slag wool for use in the present method, both the long fiber and short fiber are applicable; but, from the view point of the strength of the product moldings, fiber having a diameter in the range of $1 - 2\mu$ and a length in the range of 1 – 50 mm — preferably 5 – 30 mm — is suitable. As to the asbestos for use in the present method, inasmuch as it consists of a multiplicity of fine fibers, it is desirable to employ one of superior quality such as permitting separation of each fiber by hand. Failure to separate each fiber from other would result in lack of uniformity of the coating effect of the polymer or copolymer.

As the vinyl-type monomer for use in the present method, monomers having independent radical polymerizability or radical copolymerizability are applicable. To give examples of such monomers, there are halogenated vinyl monomers such as vinyl chloride, styrene, styrene derivatives such as $\alpha$-methyl styrene, vinyl esters of fatty acids such as vinyl acetate and vinyl propionate, unsaturated carboxylic acids such as acrylic acid and methacrylic acid, and unsaturated carboxylic ester such as methyl acrylate, ethyl acrylate, methyl methacrylate, ethyl methacrylate and propyl methacrylate. These monomers can be employed either independently or upon combining two or more of them. However, in substance, for the purpose of imparting water-durability and strength to the moldings, application of vinyl chloride, styrene and methyl polymethacrylate will bring on a particularly excellent effect. Furthermore, jointly with these vinyl-type monomers, the common divinyl monomers (as the cross-linking monomer) like ethylene glycol diacrylate, dimethacrylate such as ethylene dimethacrylate, ethylene glycol dimethacrylate, tetraethylene glycol dimethacrylate, diallyl ester of dimethacrylate, divinyl benzene, etc. may be applied.

In order to carry out the first process satisfactorily, 1 – 100 parts by weight — preferably 5 – 50 parts by weight — of the foregoing inorganic fibrous substance together with said vinyl-type monomer are added to 100 parts by weight of an aqueous medium and dispersed thoroughly therein, and then sulfur dioxide is added to the thus prepared aqueous suspension and mixed thoroughly therein by stirring. The medium is not necessarily limited to water, but a mixture of water and methanol and the like are also applicable. As to said sulfur dioxide, it is desirable to apply it in the form of aqueous solution; yet it may be blown in said suspension in gaseous phase, or may be introduced therein in the form of liquid sulfur dioxide. Further, it can be replaced with a combination of substances capable of producing sulfur dioxide by reacting with each other, such as a combination of sulfite and sulfuric acid. The application sequence of this sulfur dioxide is optional, and the appropriate amount of application thereof is in the range of 0.001 – 10 parts by weight — preferably 0.05 – 5 parts by weight — relative to 100 parts by weight of said vinyl-type monomer (vinyl compound).

The polymerization reaction in the first process does not necessarily require heating, but it is preferable to effect it by heating at a temperature in the range of 40°–70°C. The reaction is usually completed in 0.5–5 hours after the contact between sulfur dioxide and said inorganic fibrous substance. As the rate of conversion of monomer to polymer is usually in the range of 75 – 95%, it is proper to determine the amount of the stock vinyl-type monomer relative to the stock fibrous substance to be sufficient for obtaining a desired content of polymer, that is, to the extent of the desired amount of polymer/0.75–0.95 or thereabout. Inasmuch as the present invention also aims to provide reinforced resin moldings superior in stability of size thereof, the molding material is desirable to have a composition wherein the content of resin is in the range of 5 – 50% by weight — preferably 5 – 35% by weight, and the content of inorganic fibrous substance is in the range of 95 – 50% by weight — preferably 95–65% by weight. Accordingly, in the first process, the mixing ratio of said vinyl-type monomer and inorganic fibrous substance is appropriately determined so as to realize said composition.

In order to effect efficient coating of a polymer on the surface of said inorganic fibrous substance, the reaction zone is desirable to be in the state of being stirred. In the case of employing long fibers, however, it is hard to stir satisfactorily, so that it is desirable to apply shakes. At any rate, application of viorous stirring is unadvisable.

Joint application of the common water-soluble radical polymerization initiators such as hydroperoxide and persulfates tends to produce such polymers as will not contribute to coating and will lower the coating efficiency.

The composite (molding material) obtained in the first process as above consists of fibers firmly coated with a polymer or copolymer formed on the surface thereof, so that, even in water, the interface of the fiber and the resin is free from permeation of water, and it can provide a material for reinforced resin moldings having an extremely superior strength.

In the second process, the molding material obtained in the first process, that is, the fiber coated with synthetic resin, is to be subjected to pressure to be formed into moldings. This compression molding is desirable to be performed under the condition that 100°–350°C in temperature and 10–500 kg/cm$^2$ in pressure; yet it also will do to perform said compression molding without applying heat.

The reinforced resin moldings obtained through the first process and second process as above, when compared with FRIP (fiber resin reinforced thermoplastics) equal in the content of polymer as obtained by, for instance, kneading method, polymerization method, etc., have a remarkably great strength and are superior in stability of size because of high content of inorganic substance therein.

The use of the moldings to be produced by the method of the present invention is determined by the shape and construction of said moldings. The present moldings can be formed in various shapes through the compression molding in the second process and are superior in stability of size (and also superior in impact strength), so that they are especially suitable for use as engineering plastics, tile and other interior-fixture materials. Besides, by adding either thermosetting resin or thermoplastic resin or both of these resins to the molding material produced in the first process and conducting the compression molding in the second process, the impact strength of the product moldings can be further improved.

DESCRIPTION OF THE PREFERRED EMBODIMENTS

Hereunder will be given concrete examples embody the present invention and comparative examples.

Examples embodying the present invention

After dispersing 400g each of glass fiber (diameter:8$\mu$), glass wool (diamter: 3$\mu$, length of cut piece: 6mm or less), slag wool (diameter: 2$\mu$, length of cut piece: 6mm or less) and asbestos (length of fiber: 3mm or less) in 1,600g of water, a monomer was added to the dispersion with shaking over the period of 30 minutes, and subsequently the respective dispersion was heated up to 50°–80°C and 12.8g of sulfur dioxide were added to the dispersion over the period of 1 hour. Further, the dispersion was shaken for 5 hours to effect reaction and was then filtered, washed with water, and dried at 130°C. When the resulting solid matter was observed by means of a microscope, it was confirmed that the polymer had been formed on the surface of the fiber. Next, the thus obtained solid matter was subjected to compression molding at a predetermined temperature. The result was as shown in the following Table 1, respectively.

Table 1

| Stock fiber & monomer | Quantity of monomer supplied(g) | Reaction temperature (°C) | Polymer content in product (wt.%) |
| --- | --- | --- | --- |
| glass fiber —MMA | 40 | 55 | 8.1 |
| '' | 80 | 55 | 16.3 |
| '' | 120 | 55 | 18.4 |
| glass wool —MMA | 40 | 55 | 8.2 |
| '' | 80 | 55 | 15.7 |
| '' | 120 | 55 | 17.2 |
| slag wool —MMA | 40 | 55 | 8.7 |
| '' | 80 | 55 | 17.2 |
| '' | 120 | 55 | 20.5 |
| slag wool MMA:St= 50:50 | 80 | 55 | 17.0 |
| slag wool MMA:MA= 95:5 | 80 | 55 | 17.5 |
| slag wool St:AN= 70:30 | 120 | 70 | 10.2 |
| asbestos | 40 | 55 | 8.5 |
| MMA—MA (95:5) | 80 | 55 | 17.3 |

| Stock fiber & monomer | Molding condition | | | Bending strength of moldings (kg/cm²) |
| --- | --- | --- | --- | --- |
| | Temperature (°C) | Pressure (kg/cm²) | Time (min) | |
| glass fiber —MMA | 300 | 120 | 10 | 680 |
| '' | 300 | 120 | 10 | 965 |
| '' | 300 | 120 | 10 | 1057 |
| glass wool —MMA | 300 | 120 | 10 | 543 |
| '' | 300 | 120 | 10 | 721 |
| '' | 300 | 120 | 10 | 816 |
| slag wool —MMA | 300 | 120 | 10 | 421 |
| '' | 300 | 120 | 10 | 649 |
| '' | 300 | 120 | 10 | 872 |
| slag wool MMA:St= 50:50 | 250 | 250 | 10 | 612 |
| slag wool MMA:MA= 95:5 | 300 | 250 | 10 | 670 |
| slag wool St:AN= 70:30 | 250 | 250 | 10 | 470 |
| asbestos | 300 | 250 | 10 | 387 |
| MMA—MA (95:5) | 300 | 250 | 10 | 605 | herein:
MMA=methyl methacrylate,
MA =methyl acrylate,
St =styrene and
AN =acrylonitrile Comparative Examples After dispersing 400g each of the same fibers as in the foregoing Examples embodying the present invention in 1,600g of water, 80g of methyl methacrylate were added to each of the resulting dispersions. After 30 minutes' stirring, the respective dispersion was heated up to 50°–80°C, and then by adding a variety of known polymerization initiators thereto, reaction was effected for 6 hours. Subsequently, the thus reacted dispersion was filtered, washed and dried in the same way as in said Examples, and the product solid matter was subjected to 10 minutes' compression molding under the condition of 300°C in temperature and 250 kg/cm² in pressure. The result was as shown in the following Table 2, respectively.

Table-2

| Comparative Example No. | Stock fiber | Polymerization initiator and others (g) | Reaction temperature (°C) |
| --- | --- | --- | --- |
| 1 | glass wool | benzoyl peroxide | 75 |
| 2 | slag wool | $K_2S_2O_8$ 0.8 NaHSO$_3$ 0.8 | 55 |
| 3 | asbestos | azo-bis-isobutylonitrile 0.8 | 75 |
| 4 | slag wool | benzoyl peroxide 0.8 sodium oleate 0.2 | 75 |

| Comparative Example No. | Polymer content in product (wt.%) | Bending strength of moldings (kg/cm²) |
| --- | --- | --- |
| 1 | 15.5 | 171 |
| 2 | 17.1 | 205 |
| 3 | 14.8 | 180 |
| 4 | 14.5 | 165 |

What is claimed is:

1. A method of manufacturing fiber-reinforced resin moldings, which comprises the steps of:

forming an aqueous dispersion consisting essentially of from one to 100 parts by weight of the sum of the weights of the following components A and B, per 100 parts by weight of aqueous dispersing medium, A. fibers selected from the group consisting of glass fibers, slag wool fibers and asbestos fibers, B. one or a mixture of α,β-ethylenically unsaturated, radical polymerizable monomers, the weight ratio of A/B being such that the polymer-coated fibers obtained by the following polymerization step contain from 5 to 50 weight percent of polymer;

adding to said dispersion from 0.001 to 10 parts by weight of $SO_2$, per 100 parts by weight of said monomer B, as essentially the sole polymerization initiator made present in said dispersion, and maintaining said dispersion under polymerizing conditions effective to polymerize said monomer B, while agitating said dispersion, to form a polymer of B as a coating on the surfaces of fibers A, recovering from the dispersion polymer-coated fibers composed of from 5 to 50 weight percent of polymer;

and then compression molding said polymer-coated fibers to form a molded object.

2. A method according to claim 1 in which the content of monomer B in said dispersion is from (5/0.95) to (50/0.75) percent by weight, based on the sum of the weights of A plus B.

3. A method according to claim 1 in which said fibers consist of glass fibers having diameters of 1 to $2\mu$ and lengths of 1 to 50 mm.

4. A method according to claim 1 in which said fibers consist of slag wool fibers having diameters of 1 to $2\mu$ and lengths of 1 to 50 mm.

5. A method according to claim 1 in which said fibers consist of individual asbestos fibers.

6. A method according to claim 1 in which said monomer B is selected from the group consisting of halogenated vinyl compounds, styrene and styrene derivatives, vinyl esters of fatty acids, $\alpha,\beta$-ethylenically unsaturated carboxylic acids and alkyl esters thereof, and mixtures thereof.

7. A method according to claim 1 in which the sum of the weights of A and B is from 5 to 50 parts by weight, per 100 parts by weight of aqueous dispersing medium.

8. A method according to claim 7 in which the amount of sulfur dioxide added to the dispersion is from 0.05 to 5 parts by weight, per 100 parts by weight of monomer B.

9. A method according to claim 8 in which polymerization is effected with continuous shaking of the dispersion, at a temperature of 40° to 70°C, for from 0.5 to 5 hours.

10. A method according to claim 9 in which the polymer-coated fibers contain from 5 to 35 percent by weight of polymer.

11. A method according to claim 10 in which said monomer B is selected from the group consisting of methylmethacrylate, styrene and vinyl chloride.

* * * * *